United States Patent [19]

Rich et al.

[11] 3,761,065

[45] Sept. 25, 1973

[54] HIGH EFFICIENCY DIRECT GAS-LIQUID CONTACT APPARATUS AND METHODS

[75] Inventors: Stanley R. Rich, Worcester; Theophanes G. Pantazelos, Somerville, both of Mass.

[73] Assignee: RP Industries, Inc., Marlboro, Mass.

[22] Filed: May 21, 1971

[21] Appl. No.: 145,732

[52] U.S. Cl. ................. 261/76, 261/79 A, 261/116, 261/DIG. 54

[51] Int. Cl. ................................................ B01f 3/04

[58] Field of Search .................... 261/76, 79 A, 116, 261/DIG. 54

[56] References Cited

UNITED STATES PATENTS

| | | | |
|---|---|---|---|
| 1,513,599 | 10/1924 | Kay | 261/76 |
| 3,502,308 | 3/1970 | Simizu | 261/116 |

*Primary Examiner*—Tim R. Miles
*Assistant Examiner*—Steven H. Markowitz
*Attorney*—Rosen & Steinhilper

[57] ABSTRACT

This disclosure depicts high efficiency direct gas-liquid contact apparatus and methods. Spray generating means receives a liquid under pressure and produces therefrom a spray having a divergent envelope. The spray is confined within a spray chamber having an inner surface with a divergent configuration substantially fitting the spray envelope. Gas is supplied to the spray for aspiration thereby through a multiple stage radial impedance-matching inlet duct system. The radial impedance-matching inlet duct system acts to increase the velocity of the gas while decreasing the pressure thereof to effect an impedance match of the pressure of the influent gas with the sub-ambient pressure created in the spray chamber. Means are shown in the inlet duct system for deflecting the flow of gas in the ducts to create turbulence in the mixed fluid and thereby to increase the gas-liquid contact therein. One embodiment disclosed is a closed system adapted for such applications as aerating oxygen-depleted bodies of water, sewage, etc., without rendering airborne any objectionable substances or organisms which might be present in the bodies.

28 Claims, 9 Drawing Figures

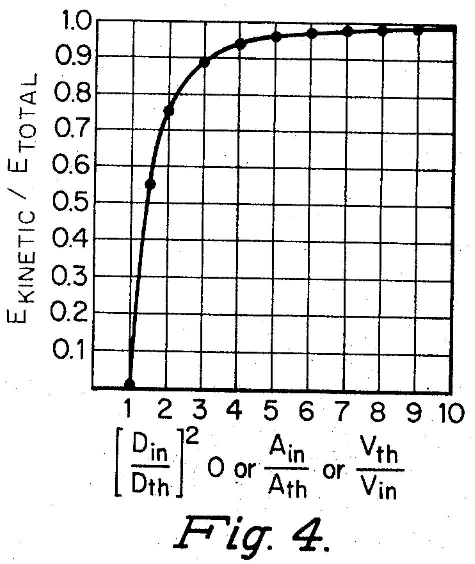
Fig. 4.
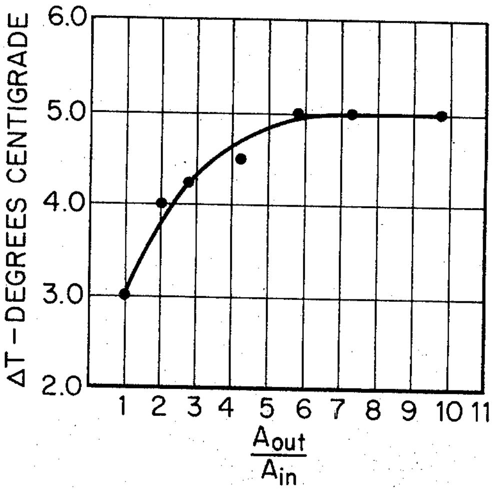
Fig. 5.
Fig. 7.
| | $T_{WET\ BULB}$ (°C) | $T_{in}$ (°C) | $T_{out}$ (°C) | $\Delta T$ (°C) | |
|---|---|---|---|---|---|
| PRIMARY STAGE | 20.0 | 33.9 | 31.0 | 2.9 | (1) |
| PRIMARY AND SECONDARY STAGES | 17.7 | 30.6 | 24.3 | 6.3 | (2) |
| | 18.3 | 31.0 | 24.6 | 6.4 | (3) |
| | 20.0 | 33.9 | 27.1 | 6.8 | (4) |
| | 17.8 | 75.0 | 45.0 | 30.0 | (5) |
| PRIMARY AND SECONDARY STAGES WITH TURBULATION | 22.2 | 77.0 | 39.0 | 38.5 | (6) |
| | 22.2 | 43.0 | 29.0 | 14.0 | (7) |
| | 22.2 | 36.5 | 26.2 | 10.3 | (8) |
| | 22.2 | 31.0 | 24.5 | 6.5 | (9) |
| | 22.2 | 28.5 | 23.5 | 5.0 | (10) |
| | 22.2 | 27.5 | 23.0 | 4.5 | (11) |
| | 22.2 | 26.0 | 22.5 | 3.5 | (12) |
| | 22.2 | 25.0 | 22.5 | 2.5 | (13) |
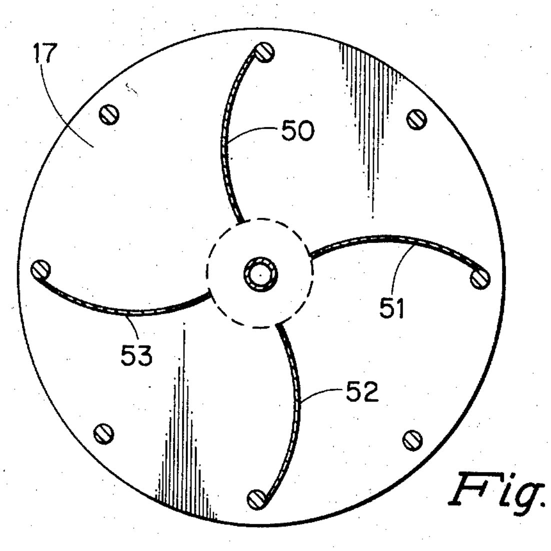
Fig. 6.
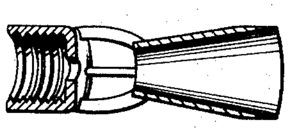
Fig. 9.

HIGH EFFICIENCY DIRECT GAS-LIQUID CONTACT APPARATUS AND METHODS

BACKGROUND OF THE INVENTION

It has been long recognized that many processes which involve the admixture of gases and liquids, for example evaporative cooling, gas scrubbing, oxygenation, chemical reaction enhancement, are optimized by creating the greatest possible liquid-gas interface area. U.S. Pat. No. 2,020,850 — Myhren et al. evidences this recognition by suggesting the use of a spray in a gas-liquid contact device to create large numbers of small droplets for interaction with the gas. The Myhren et al patent evidences recognition of the desirability of using the principle of an aspirator in a gas-liquid mixing device.

The extreme simplicity of aspirative principles presents a very powerful attraction to those attempting to seek improved methods of maximizing gas-liquid contact. Prior art devices, however, represented by Myhren et al. as well as U.S. Pat. Nos. 2,017,031 - Stratton; 2,191,864 - Schaefer; 3,446,285 - Hout; 2,324,605 - Urquhart; and 1,658,533 - Mart, failed to recognize or appreciate a number of fundamental principles which are exploited by the present invention and without which high efficiencies are unattainable in gas-liquid contact devices that utilize aspiration.

This invention is directed to the provision of extremely efficient gas-liquid contact devices and methods that utilize aspirative principles and are capable of inducing gas into a stream of liquid particles in quantities far greater than was possible with prior art devices. Using a gas-liquid contact device constructed according to the present invention, up to 4,800 volumes of gas per volume of liquid have been induced into the resulting mixed fluid stream.

Because of the very high efficiencies obtainable with structures according to this invention, new fields of application have been opened. In the field of evaporative cooling, for example, those of the principle of aspiration for effecting evaporative cooling has long been explored, but apparently without success. U.S. Pat. Nos. 2,191,864 Schaefer (noted above); 2,152,251 - Gay; 2,724,246 - Lowe; and 1,626,360 - Sausen et al. manifest attempts to develop aspirative-type evaporative cooling systems. To our knowledge, however, no commercially successful evaporative cooling system which exploits the aspiration principle has ever been introduced. The reason seems clear — prior art aspirating devices have not had the gas-liquid contact efficiency requisite to be competitive with other cooling methods. This invention for the first time makes commerically feasible an efficient evaporative cooling system utilizing the aspiration principle. As pointed out in data reproduced below, heat exchange efficiencies substantially exceeding those attainable with presently existing commerical apparatus, such as conventional cooling towers, have been obtained.

In the field of oxygenation and aeration, the desirability of exploiting the extreme simplicity and low cost of aspirative devices has been recognized. For example, see U.S. Pat. Nos., 2,591,134 - Canariis; and 3,311,239; and 3,271,204 - Valdespino et al. It is believed that no successful commercial aeration or oxygenation equipment is on the market today which operates on the aspiration principle. Again, we attribute this failure of the prior art to provide commerically acceptable aspirative-type aeration or oxygenation equipment to the relatively low efficiencies attainable using prior art aspirating methods and structures.

State-of-the-art aeration equipment for aerating bodies of water, sewage ponds, etc., typically of the types which either bubble air through the body or throw the liquid into the air, are not only extremely inefficient but distribute noxious odors, gases, and other effluvia and, in the case of sewage aeration, may broadcast potentially lethal organisms. The potential dangers described were brought to light recently in the Sept. 18, 1970 issue of SCIENCE (The Journal of the American Association for the Advancement of Science), in an article entitled "Coliform Aerosols Emitted by Sewage Treatment Plants," by A. Paul Adams and J. Clifton Spendlove of the Desert Test Center, Fort Douglas, Utah. The article points out that ordinary aeration systems cause bacteria and other pathogens to become suspended in the air used for aeration. The article states that Coliform bacteria have been detected up to 0.8 miles from a sewage treatment plant!

We describe below a closed-system embodiment of this invention having many useful applications, including the aeration-oxygenation applications discussed which substantially completely suppresses the production of such potentially obnoxious and dangerous effluvia.

As pointed out below, apparatus constructed according to this invention is singular in its oxygenation capability. Because of the extremely high gas-liquid interface area created in devices following our invention, we contemplate that its application to such gas-liquid contact processes as gas scrubbing, chemical reaction enhancement, etc., will produce similarly outstanding results.

OBJECTS OF THE INVENTION

It is an object of this invention to provide substantially improved gas-liquid contact apparatus and methods.

It is another object of the invention to provide gas-liquid contact apparatus and methods having such high efficiencies as to make possible the provision of commercially competitive aspirative evaporative coolers, gas scrubbers, aeration and oxygenation equipment, and the like.

It is yet another object to provide closed-system apparatus and methods useful, for example, for aerating or oxygenating bodies of liquid such as oxygen-depleted lakes, sewerage ponds, etc., in such a way as to suppress the broadcasting into the air of potentially dangerous gases, odors, toxic chemicals, organisms and the like.

It is still another object of this invention to provide oxygenation and evaporative cooling apparatus which is extremely efficient, yet simple in structure and operation, compact, and relatively inexpensive to manufacture, operate, and maintain.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 4 is a daigram relating the conversion of potential to kinetic energy of first stage gas influent to relative dimensions of a radial impedance-matching inlet duct means comprising part of the FIGS. 1–3 apparatus;

FIG. 5 is a diagram relating temperature drop produced by a cooling device constructed according to this invention to relative dimensions of a spray chamber element;

FIG. 6 is a sectional view illustrating an alternative embodiment of means for generating turbulence within the gas-liquid mixture to enhance gas-liquid contact;

FIG. 7 is a table of data showing the evaporative cooling achieved in tests conducted with apparatus implementing this invention;

FIG. 9 shows an eductor-type nozzle which may be used as the spray-generating means in place of the impact-type nozzle shown in the FIGS. 1–2 embodiment.

DESCRIPTION OF THE PREFERRED EMBODIMENTS

Figures 1, 2, 3:
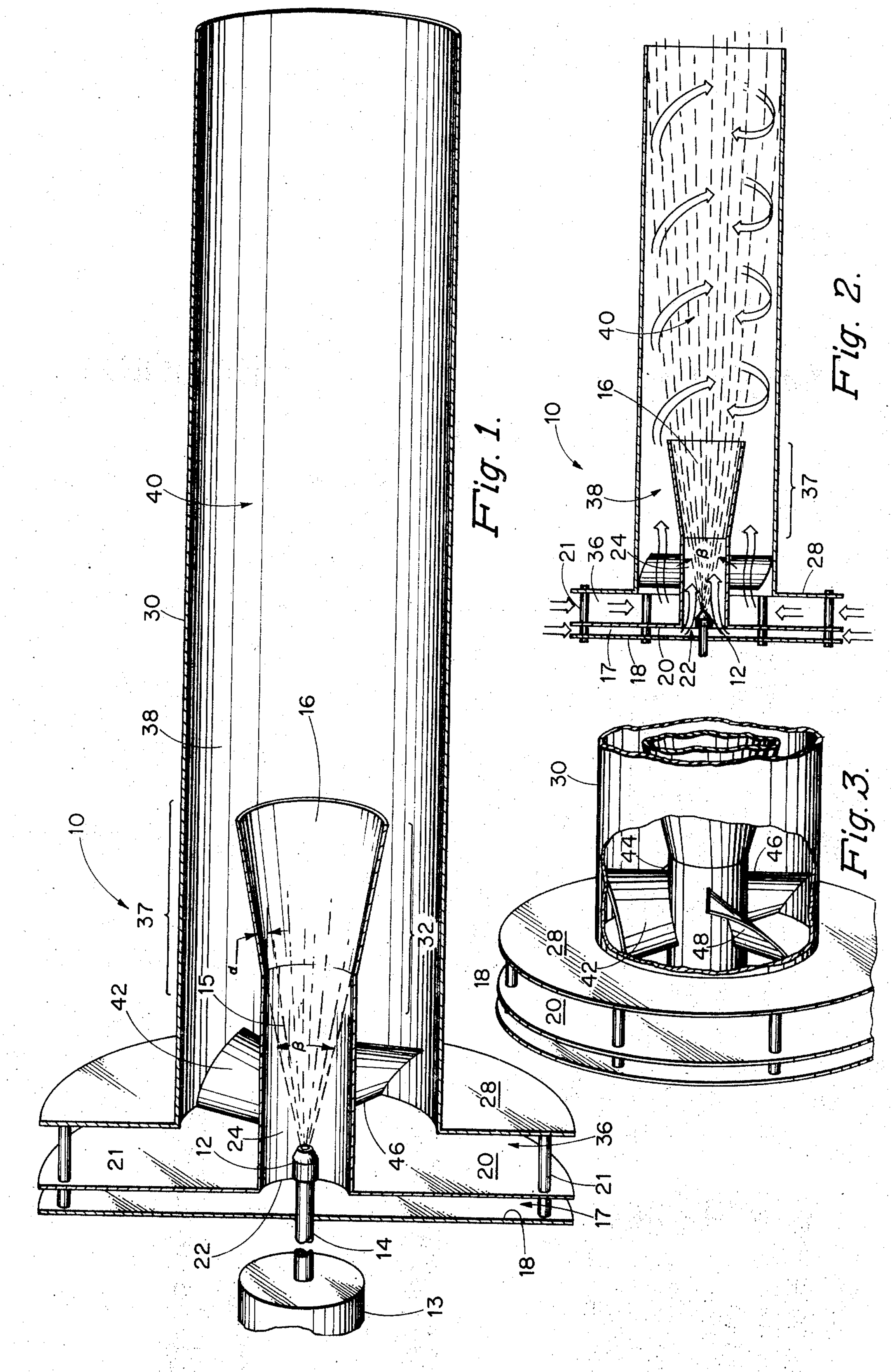
FIG. 1 is a perspective sectional view of a preferred embodiment of the invention.
FIG. 2 is a side elevational sectional view of the FIG. 1 embodiment.
FIG. 3 is a fragmentary perspective view, partly broken away, of the FIGS. 1–2 embodiment.

This invention involves the recognition and full utilization of a number of principles applicable to aspirative gas-liquid contact devices which were either totally unknown or not fully appreciated by the prior art. The exploitation of these principles has enabled us to provide a gas-liquid contact device with efficiencies far exceeding those achievable with any known prior art device.

A first principle of great importance involves the creation of what we term a "porous piston." According to this invention, an aspirative gas-liquid contact device is preferably provided with a spray-generating means, such as an impact nozzle, which produces a full spray having a divergent (typically conical) envelope. A spray chamber is provided which has an inner surface substantially fitting the spray envelope. The spray chamber preferably has an angle of divergence substantially equal to that of the spray and fits the spray envelope as closely as possible without substantial deposition of the spray on the chamber walls. We have recognized that any deposition of the spray on the walls of the spray chamber must necessarily decrease the momentum in the spray available for transfer to the induced gas (or, more accurately, to the gas-liquid mixture). Prior art such as U.S. Pat. No. 2,105,773 evidences a complete failure to recognize this need to preclude deposition of the spray. This patent, in fact, suggests that it is desirable for the spray to impinge on the walls of the spray chamber.

We have found that to implement the "porous piston" concept to its fullest, the liquid spray should be a full spray — that is, a spray in which the distribution of particles is substantially uniform throughout, as opposed to a "hollow" spray in which the distribution of particles is more dense around the periphery of the spray than in the center thereof. Summarizing briefly, the provision of a porous piston in an aspirator according to this invention involves the provision of a spray, preferably full, which is confined by a form-fitting spray chamber to prevent any substantial gas leaks between the spray and the walls of the spray chamber. The momentum in the spray may be increased, to a limit, by raising the liquid pressure at the spray nozzle, and thus increasing the spray velocity and flow rate.

A second principle, also of great importance, involves the provision of a novel gas inlet duct employing a radial duct structure as an impedance-matching device. We have found that the use of one (or preferably multiple) radial impedance-matching stages to effectively impedance match the sub-ambient pressure created by the "porous piston" to the outside ambient pressure very substantially improves gas aspiration in our device. The provision of a first raidal impedance-matching stage for feeding the inlet to the spray chamber is of primary importance. The addition of a second stage which supplies gas to be aspirated by the spray at a downstream zone is also very important. We have discovered that by feeding the secondary inlet gas to the spray through an anular, axially oriented orifice such that the gas is introduced adjacent the walls of the spray chamber, the "porous piston" effect is enhanced by substantially preventing deposition of the spray on the downstream walls of the spray chamber.

A third and also extremely important principle which we have implemented in our novel gas-liquid contacting devices involves the use of turbulating means, such as a set of fixed stator vanes, for artificially introducing turbulence in one or more of the gas inlet ducts to thereby create turbulence in the gas-liquid mixture. The result is a marked increase in the gas-liquid contact within the mixed fluid with consequent enchanced performance in those applications where maximized liquid-gas interaction is desirable.

These three principles as well as other novel features and concepts are implemented in structures described in more detail hereinafter.

FIGS. 1–3 illustrate a preferred one of the many possible embodiments of the principles of this invention. An aspirative gas-liquid contact device 10 includes spray-generating means shown in the form of a nozzle 12. The nozzle 12 receives liquid (e.g. water) under pressure from a pump 13 through a supply conduit 14. The nozzle 12 is preferably of the type which produces a full conical spray 15. Although the spray angle $\beta$ is not critical, we have been very successful using a commerically available nozzle of the impact type having a spray angle of 30°. Spray pressures may vary considerably, however, a spray pressure in the range of 2 to 100 lbs. per square inch has produced very satisfactory results.

As explained above, in order to implement the described "porous piston" effect, a spray chamber is provided which substantially fits the spray 15. In the illustrated embodiment a primary spray chamber 16 is shown as taking the form of a flared trumpet which has an inner surface with a conically divergent configuration substantially fitting the spray envelope. The spray chamber 16 may be constructed from suitable sheet stock. We have found it preferable that the chamber 16 have a flare angle $2\alpha$ which is substantially equal to the spray angle $\beta$ of the spray 15 produced by the nozzle 12. The chamber 16 should be of a size such that its inner surface surrounds the spray 15 as closely as possible. In this regard, see U.S. Pat. No. 1,784,019 - Mart which expounds the prior art's failure to recognize and exploit the "porous piston" concept.

As will be explained in more detail below, the axial length of the primary spray chamber 16 is quite crucial; it should be such as to allow near optimum mixture of gas and liquid with minimal loss or conversion of kinetic energy of the spray-gas mixture to potential energy. It is desirable to maintain maximum velocity of the spray-gas mixture throughout the system in order to maximize the momentum available for induction of gas through subsequent gas inlet stages. As discussed in detail below, we have found that the optimum length of the chamber 16 is that length which provides an area ratio from chamber outlet to chamber inlet of between about 3 to 8.

The device 10 develops a sub-ambient pressure at the inlet to the spray chamber 16. It is desirable to supply gas to that space at substantailly the same pressure as exists at the spray chamber inlet, that is to say, it is desirable to provide a gas inlet duct system which provides an impedance match with the inlet to the spray chamber 16. In accordance with this invention a radial impedance matching gas inlet duct system is provided which is extremely effective in establishing such an impedance match. The proper impedance match then maximizes the volume of gas aspirated by the liquid spray.

It is well known from Bernoulli's principle that the total energy in a gas is proportional to the square of its velocity, linearly proportional to its static pressure, and linearly proportional to the heat energy or enthalpy of the gas. It is also well known from an application of this principle that gas flowing through a non-energy-absorbing conduit of changing cross-section will obey the relation $$(V_1^2/2g) + \rho P_1 + H_1 \cong (V_2^2/2g) + \rho P_2 + H_2 \qquad (1)$$

where $V_1$ equals the gas velocity at point 1 in the conduit, $V_2$ equals the gas velocity at point 2 in the conduit, $P_1$ is the static pressure at point 1 in the conduit, $P_2$ is the static pressure at point 2 in the conduit, $H_1$ and $H_2$ represent the enthalpy at points 1 and 2, and $\rho$ is the density of the medium. It is an object of this invention to provide a radial inlet duct system capable of exploiting these fluid dynamics principles to convert that amount of potential energy (pressure) in a gas supply duct system into kinetic energy as is necessary to effect a substantial impedance match to an aspirator spray chamber such as to optimize the rate of gas induction through the system. For a more detailed explanation of the structure and operation of a radial impedance-matching duct in an unrelated application, reference may be had to U.S. Pat. No. 3,169,509, issued to S. R. Rich, one of the co-inventors hereof.

In the FIGS. 1–3 embodiment, a primary gas inlet duct 17 comprises a radial impedance-matching structure defined by a pair of plates 18, 20 which define axially spaced surfaces coaxial with and spaced from the nozzle 12 to define an annular passageway leading to a circular opening 22 in a throat 24 connected to the inlet to the primary spray chamber 16.

It can be seen from an inspection of FIGS. 1–3 that the effective inlet cross-sectional area $A_{in}$ of the primary inlet duct 17 equals $\pi D_{in} T_1$ where $D_{in}$ represents the diameter of the plates 18, 20, and $T_1$ is the spacing therebetween. The effective outlet cross-sectional area $A_{out}$ of the duct 17 is equal to $\pi D_{th} T_1$ where $D_{th}$ represents the effective inner diameter of the throat 24. It is evident that in the illustrated embodiment cross-sectional area of the duct 17 decreases and gas velocity increases linearly as a function of decreasing radius. Utilizing the relation (1) above, the minimum dimensions of the duct 17 necessary to impedance match the spray chamber inlet pressure can be determined. We have found that for a duct 17 constructed as shown, the ratio of the $A_{in}$ to $A_{out}$, or alternatively, the ratio of the outlet velocity $V_{out}$ to the inlet velocity $V_{in}$ should be in the range of between about 1.5 and 10 for all practical applications which we contemplate. The particular optimum ratio value selected depends, inter alia, upon the magnitude of the sub-ambient pressure created at the inlet to the spray chamber by the spray generating means, and the flow characteristics desired for optimum induction at later gas inlet stages. Ambient pressure is herein taken to mean the pressure of the gas in the gas supply available to the device.

For an understanding of how this critical range of 1.5 to 10 for the noted ratios was arrived at, reference may be had to FIG. 4. FIG. 4 is a curve showing the ratio of kinetic energy to total energy plotted as a function of $(D_{in}/D_{th})^2$ or $A_{in}/A_{out}$, or $V_{out}/V_{in}$. It can readily be seen from an inspection of this diagram that a radial impedance-matching section in which the noted ratios are less than 1.5 converts less than roughly 55 percent of the available potential energy to kinetic energy, a figure which we consider to be a minimum. At the other end of the range it can be seen that ratios greater than 10 produce little added conversion of potential to kinetic energy, since the conversion is at that point 99 percent consummated and is approaching the 100 percent limit asymptotically. It is also evident from the FIG. 4 diagram that ratios bracketing the knee of the curve between about 2.5 and 5 represents a more critical range in the optimization of the performance of an aspirative gas-liquid contact device according to the teachings of this invention. The prior art, e.g., U.S. Pat. No. 3,446,285 - Hout appears to have completely missed the basic principles as well as the crucial optimizing parameters governing radial impedance-matching with the result that prior art inlet duct systems were very inefficient.

As will be explained in detail below, we have been able to achieve very high aspiration rates using only a primary stage comprising inlet duct 17, the spray nozzle, 12, and spray chamber 16. We have, however, been able to achieve even higher aspiration rates by the addition of a secondary gas inlet duct, comprising a combined radial impedance-matching structure and annular axial venturi, which is effective to impedance-match secondary influent gas with the spray-gas mixture at the exit from the primary spray chamber 16.

The secondary gas inlet duct is illustrated as comprising a plate 28 secured to and spaced from plate 20 by spacer bolts 21. The plate 28 supports a barrel 30. A radial impedance-matching section 36 of the secondary gas inlet duct is similar in structure to the primary inlet duct 17 and may be constructed according to the principles described above in connection therewith. The area of the inlet to the radial impedance-matching section 36 is equal to $\pi D_{in} T_2$ where $D_{in}$ is the diameter of the plates 20, 28 and $T_2$ is the spacing between the plates 20 and 28. The area at the outlet of the radial impedance-matching section 36 is equal to $\pi D_b T_2$ where $D_b$ represents the inner diameter of the barrel 30. The area of the inlet to the barrel 30 is made equal to the outlet area of the radial section 36. There is defined between the inner surface of a portion 37 of the barrel 30 and the exterior surface of the spray chamber 16 an annular axial venturi 38 having the characteristic that its effective cross-sectional area decreases as a function of increasing axial distance from the nozzle 12. According to an aspect of this invention, the external surface of the flared primary spray chamber 16 serves as a surface defining the annular axial venturi 38. Simplicity and economy of manufacture are thus obtained by this construction.

We have found that the same general considerations apply to the ratios of inlet area to outlet area (or, alternatively, the outlet velocity to inlet velocity) that were discussed with respect to the primary inlet duct 17. That is to say, we have found that the ratio of the area at the inlet to the radial impedance-matching section 36 to the area at outlet of the annular axial venturi 38 (i.e., at the annular opening surrounding the outlet end of the chamber 16) should be between about 1.5 and 10. The teachings of this invention, as set forth immediately above, should be compared with such prior art as U.S. Pat. No. 2,247,850 -Rayburn, which shows an aspirating device incorporating what at first appears to be an annular axial venturs between an expansion nozzle 26 and a tube 27. A study of the Rayburn disclosure reveals an obvious lack of understanding of the principle of an annular axial venturi. The result is an almost uselessly inefficient venturi construction, which can be described more properly as a conduit rather than a venturi.

The addition of the secondary gas inlet duct improves the performance if the device 10 over that achievable with a single stage as described by about 20 percent.

The combination of a radial impedance-matching section 36 with an annular axial venturi as shown at 38 has a number of important features aside from the fundamental expedient of effecting an impedance match. We have found that supplying additional gas to the gas-liquid mixture through an annular axially directed opening adjacent the inner surface of barrel 30 creates a gas barrier layer between the spray and the confining inner surface of the barrel 30 which prevents deposition of the spray on the inner surface of the barrel 30. As explained above, any deposition of the spray on the spray-confining walls seriously decreases the efficiency of a gas-liquid contact device constructed according to this invention.

The portion of the barrel 30 extending beyond the outlet end of the primary spray chamber 16 defines what may be regarded as a secondary spray chamber 40. It is well known that the spray issuing from a spray nozzle will diverge for a distance and then, due primarily to Bernoulli forces acting between the moving spray particles, will tend to collapse to a substantially cylindrical envelope configuration. The cylindrical configuration of the secondary spray chamber implements our recognition of the described Bernoulli forces. Consonant with the "porous piston" concept discussed in detail above, the diameter of the secondary spray chamber 40 should be such that the walls thereof substantially fit the envelope of the liquid-gas mixture.

The diameter of the secondary spray chamber 40 must also be considered as it relates to the diameter of the primary spray chamber 16 at its outlet since the space between the secondary spray chamber 40 at this point and the outlet of the primary spray chamber 16 defines the outlet area of the secondary gas inlet duct 26.

The length of the secondary spray chamber 40 should be of sufficient magnitude to confine the spray to a point where total utilization of available momentum is effected. We have found that a secondary spray chamber length in the range of 4–5 times the diameter thereof produced very satisfactory results in apparatus constructed as shown in FIGS. 1–3.

As indicated briefly above, we have found that the length of the divergent primary spray chamber 16 is quite important. If the trumpet is too short, the full effect of the "porous piston" produced by the spray within the chamber 16 is not exploited. However, if the chamber 16 is longer than necessary, the venturi effect thereof, which acts to convert kinetic energy of the gas-liquid mixture in the chamber 16 to potential energy, reduces unnecessarily the velocity of the mixture at the output from the chamber 16.

FIG. 5 is a diagram depicting evaporative cooling achieved in a gas-liquid contact device constructed according to this invention plotted against the ratio of output area $A_{out}$ at the end of the spray chamber 16 to the input area $A_{in}$ thereof. It can be seen from the diagram that the effect of increasing the chamber length is quite dramatic up to ratios in the range of about 5 – 8, beyond which the curve levels off; improvement in results thereafter is negligible. We have found that critical range of $A_{out}/A_{in}$ to be between about 3 and 8. Selection of a trumpet length such as to produce an $A_{out}/A_{in}$ ratio in this critical range optimizes the gas induction without unnecessarily decreasing the output velocity of the gas-liquid mixture from the chamber 16 (and thus reducing the energy available to induce more gas in subsequent stages). The magnitude of the cooling accomplished in the device as noted in FIG. 6 cannot be overlooked; however, a discussion of the true significance of the evaporative cooling capability of devices following this invention is deferred for discussion below.

As mentioned briefly in the introductory material above, it is an aspect of this invention to provide turbulating means in the gas inlet duct system for creating turbulence in the flow of gas in the gas-liquid mixture to thereby increase the gas-liquid contact in the apparatus. FIG. 1 illustrates but one of the many possible implementations of this concept, comprising a set of stator vanes 42, 44, 46, and 48. The purpose of the turbulating means is to induce a component of angular movement in the gas flow through the duct system so as to create a swirling turbulent action in the spray-gas mixture and thereby maximize the interaction of liquid particles with aspirated gas.

The stationary vanes 42, 44, 46, and 48 may take any of a great variety of configurations effective to achieve the desired turbulence; however, in the illustrated embodiment they are shown, by way of illustration only, simply as planar plates affixed to the exterior surface of the throat 24 and extending into the secondary gas inlet duct 26 at 45° to the axis of the throat 24. In an embodiment constructed and tested satisfactorily, the vanes were 2 ¼ in. in length.

FIG. 6 shows an alternative embodiment of the turbulating means comprising a set of fixed spiral stator vanes 50, 51, 52, 53 in an inlet duct 17' similar to duct 17. As in the FIG. 1 embodiment, the FIG. 6 vanes 50, 51, 52, 53 introduce an angular component of motion in the gas entering the spray chamber through the inlet duct 17'. As another alternative, a similar set of stationary spiral or other vanes may be located in the radial impedance-matching section 36 comprising part of the secondary gas inlet duct. Or, turbulating means may be placed in each gas inlet stage, with like or counter-directional rotative influence. Many other embodiments and arrangements are contemplated.

We contemplate a great many applications for devices constructed according to the principles of this invention; applications which appear to have the greatest significance at this time include evaporative cooling, oxygenation and aeration, gas scrubbing, fuel combustion, and chemical reaction enhancement. In tests performed on apparatus constructed according to FIG. 1, rates of air induction in the order of 4,800 volumes of gas induced per volume of liquid input have been achieved. These rates far exceed those attainable by any known prior art apparatus.

Accurate measurements of the efficiency of a gas-liquid contact device according to this invention have been obtained by tests of the evaporative cooling capability thereof, and of its ability to charge a liquid with a gas (e.g., to oxygenate). The table shown at FIG. 7 shows data taken during tests performed on the FIG. 1 apparatus to measure its evaporative cooling capability. The table shows (row 1) data taken using only the primary stage of the device comprising primary spray chamber 16 and inlet duct 17. These results compare very favorably with evaporative cooling capabilities of any known prior art device. The addition of a secondary stage (see data in rows 2–5) creates evaporative cooling rates far exceeding those achievable by known prior art. For example, as indicated in row 5, in a high temperature test wherein water at a temperature of 75°C was introduced into the device, cooling of 30.0°C (54°F) was achieved! To compare the results obtained directly with known standards of performance for evaporative coolers, Marks' Mechanical Engineering Handbook, 5th Edition, p. 1,185, establishes a typical temperature drop introduced by state-of-the-art apparatus as being 30°F. Thus, it becomes readily evident that the 54°F drop achieved under comparable conditions by our device is nearly twice the cooling achievable with state-of-the-art apparatus.

The addition of the turbulating means (see the data in Fig. 7, rows 6–13) increases the performance of the device by an additional 20–30%. The high temperature test (row 6) reveals a temperature drop of 38.5°C (67°F) cooling achieved! This performance, by the standards stated by the Marks' Mechnical Engineering Handbook (see above) is more than twice the performance of state-of-the-art evaporative coolers. The data in row 8 is noteworthy. A 10.3°C (18°F) temperature drop was obtained with an effluent temperature at only 7.2°F above the wet bulb temperature (22.2°C). Finally, the data in row 13 indicates 2.5°C cooling achieved with the effluent at a mere 0.3°C above wet bulb temperature.

The FIG. 7 table data thus reveals the extreme efficiency of a device following the teachings of this invention as compared with any known prior art apparatus.

Another measure of the efficiency of a gas-liquid contact device is its ability to charge a liquid with a gas. In tests on the FIGS. 1–3 device, stagnant water having between 0–1 parts per million oxygen was oxygenated substantially to saturation (8.5 – 8.8 parts per million for gas and water temperatures in the tested range of 72°–75°F). Oxygen content was measured by a "modified Winkler test." These test results are also considered to be of extreme importance in illustrating the very great gas-liquid contact capabilities of devices constructed according to this invention.

The apparatus with which the above-noted test results were achieved, was constructed as shown in FIGS. 1–3 and had the following dimensions: $D_{in}$ = 24 in.; $D_{th}$ = 4 in.; $D_b$ = 12 in.; $T_1$ = 1 in.; $T_2$ = 2 ¾ in.; $\beta$ = 30°; 2 $\alpha$ = 30°; L = 52 in.; and $L_t$ = 8 in. L and $L_t$ represent the length of the barrel 10 and throat 24.

Figure 8:
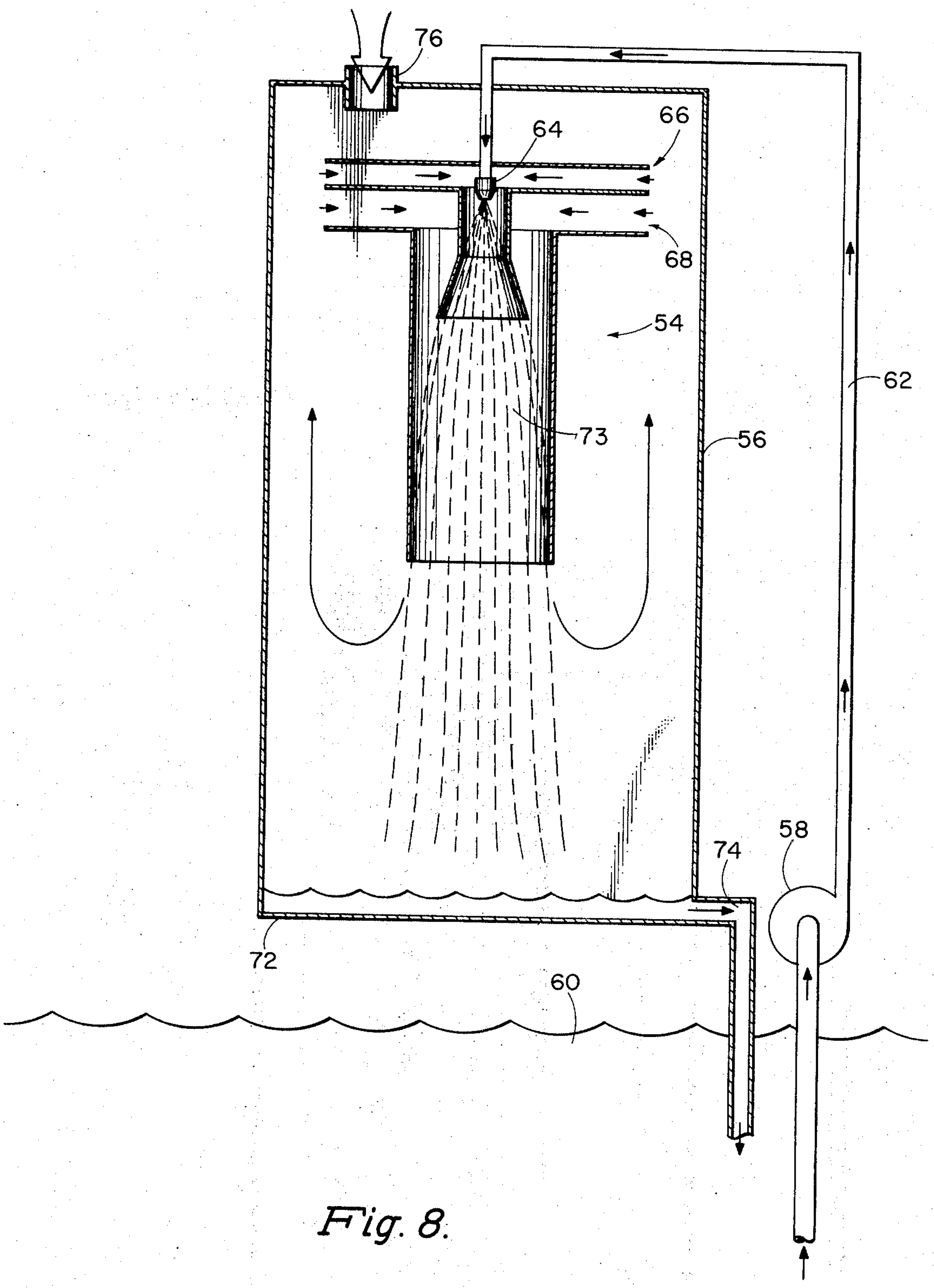
FIG. 8 illustrates a closed-system embodiment of this invention for such applications as aerating oxygen-depleted liquid bodies.

FIG. 8 illustrates schematically a closed-system embodiment of the invention having a wide variety of applications, including chemical reaction enhancement and aeration or oxygenation of oxygen-depleted bodies of water, seware ponds and the like, comprising, an aspirative gas-liquid contact device 54 sealed within a housing 56. A liquid pump 58 is provided for drawing a continuous flow of oxygen-depleted water from a body 60 of oxygen-depleted liquid. The pump 58 pressurizes the flow and conveys it through a conduit 62 to a spray nozzle 63 comprising part of said device 54. By the nature of an aspirative gas-liquid contact device as described above, a region of sub-ambient pressure is created within the liquid spray chambers, causing air to be drawn into the device through primary and secondary gas inlet ducts 66, 68.

The oxygen-enriched liquid droplets emitted from the device 54 are collected in a collection pan 72 at the bottom of the housing 56 and are returned to the body 60 through a return conduit 74 terminating below the surface of the body 60.

A portion of the air induced into the gas-liquid contacting device 54 through the inlet ducts 66, 68 is dissolved in the spray 73 created by the nozzle 64. An opening 76 is provided in the housing 56 to allow entrance into the housing 56 of the air necessary to make up for the volume of air dissolved and carried off by the liquid. Undissolved air is recirculated to the inlets to the ducts 66, 68. Thus, it is seen that the closed-system FIG. 8 embodiment is a negative pressure system which draws atmospheric air (or more generally, ambient gas — i.e. the gas supplied to the gas inlets) into itself, rather than expelling gases, bacteria, or other effluvia into the atmosphere. By the FIG. 8 system, the oxygen-depleted body 60 is oxygenated and oxidizable compounds oxidized without escape into the atmosphere of gases and organisms present in the body 60. A system is thus provided for, inter alia, for aerating sewerage ponds, stagnant lakes, and the like, without creating the dangerous and bothersome effluvia produced by the (a) diffused air aeration, and (b) mechanical surface aeration methods used today.

In tests conducted using a sealed system as shown in FIG. 8, water drawn from a depth of 22 feet in a stagnant lake near Boston, Massachusetts, was aerated and returned to the lake. Using the Winkler method of oxygen measurement, the input water was found to contain no detectable oxygen. The oxygen-enriched output from the system after but one pass through the FIG. 8 system was measured (using the same method of measurement) to be substantially saturated with oxygen. The transit time through the system is less than one-half second. Further, whereas the input liquid was found to contain two parts per million of noxious hydrogen sulfide, the output from the system contained no detactable hydrogen sulfide. Thus, in addition to oxygenation of the liquid, odor of the foul-smelling and potentially injurious hydrogen sulfide compound is neutralized. Yet another feature of our device in the described application is its cooling of water as it is aerated.

We contemplate the use of the described sealed system in other applications such as hydrogenation of vegetable oils, and treatment of liquids and liquid waste effluents with pure oxygen, ozone, chlorine, or other suitable gases.

Structural implementations other than and different from those described above are within the purview of this invention. For example, whereas two gas inlet duct stages have been shown, further stages embodying the teachings of this invention may be added. As suggested above, various means other than those shown may be employed for introducing turbulence in the gas-liquid mixture for those applications in which optimum gas-liquid contact is desired.

Whereas the spray-generating means has been shown in the form of a nozzle 12 described as being of the impact type, for applications such as sewage aeration wherein the sprayed liquid may contain solid matter, the spray nozzle may be an eductor, for example of a type shown in FIG. 9 which is manufactured by the Hypro Corporation, designated Eductor No. 3371. Of incidental interest in connection with the use of an eductor as a spray generator in an aspirating device, reference may be had to U.S. Pat. No. 2,577,451 — Clemens.

The radial impedance-matching sections in both inlet duct stages have been shown as comprising parallel flat plates; parallelism, however, is not a requisite. The primary constraint of radial impedance-matching structures constructed according to this invention is that the effective cross-sectional area decrease (not necessarily linearly) as a function of decreasing radius.

As suggested above, we contemplate use of devices according to this invention as fuel combustion apparatus wherein the liquid sprayed is the fuel to be burned and the gas induced is the air or other gaseous reactant.

The invention is not limited to the particular details of construction of the embodiments depicted and it is contemplated that various and other modifications and applications will occur to those skilled in the art. Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. High efficiency aspirative gas-liquid contact apparatus, comprising:

spray generating means for receiving a liquid under pressure and for producing therefrom a full spray having a divergent envelope;

means defining a divergent spray chamber surrounding and substantially fitting said spray envelope, said chamber having an inlet area $A_{in}$ and an outlet area $A_{out}$ which is greater than $A_{in}$ by a factor of between about 3 and 8; and radial, annular impedance-matching inlet duct means for conducting gas to be aspirated from a gas supply to said spray chamber, said duct means having an inlet effective cross-sectional area which is greater than its outlet effective cross-sectional area, said duct means acting to increase the velocity of said gas while decreasing the pressure thereof below that of the gas supply.

2. The apparatus defined by claim 1 wherein said factor is substantially 2.

3. High efficiency aspirative gas-liquid contact apparatus, comprising:

spray generating means for receiving a liquid under pressure and for producing therefrom a spray having a divergent envelope;

means defining a spray chamber surrounding said spray and positioned on a common axis therewith, said chamber having an inner surface with a divergent configuration substantially fitting said spray envelope; and radial impedance-matching inlet duct means for conducting gas to be aspirated from a gas supply to said spray chamber, said duct means having axially spaced surfaces with and spaced from said spray generating means for defining an annular passageway leading to an inlet end of said spray chamber adjacent said spray generating means in which cross-sectional area decreases as a function of decreasing radius, said duct means acting to increase the velocity of said gas while decreasing the pressure thereof below that of the gas supply.

4. The apparatus defined by claim 3 wherein said spray chamber has an inlet area $A_{in}$ and an outlet area $A_{out}$ which is greater than $A_{in}$ by a factor of between about 3 and 8.

5. The apparatus defined by claim 3 wherein said inlet duct means has an inlet area $A_i$ and an outlet area $A_o$ having the relationship:

$$1.5 < (A_i/A_o) < 10.$$

6. The apparatus defined by claim 3 wherein said spray generating means constitutes an eductor, comprising jet means for forming a stream of said liquid, nozzle means for receiving said stream in close-fitting relationship thereto, and support means for spacing said nozzle means from said jet means to provide an opening for gas to be induced into said nozzle means.

7. High efficiency aspirative gas-liquid contact apparatus, comprising:

spray generating means for receiving a liquid under pressure and for producing therefrom a full spray having a divergent envelope;

means defining a spray chamber surrounding said spray and positioned on an axis common therewith, said chamber having a divergent inner surface which substantially fits said spray envelope; and inlet duct means for conducting gas to be aspirated from a gas supply to said spray, including radial impedance-matching means having axially spaced surfaces with said spray generating means for defining an annular passageway configured such that its cross-sectional area decreases as a function of decreasing radius, said radial impedance-matching means communicating with said spray through an annular axial venturi configured such that its cross-sectional area decreases as a function of axial distance from said spray generating means, said duct means acting to increase the velocity of said gas while decreasing the pressure thereof below that of the gas supply.

8. The apparatus defined by claim 7 wherein said spray chamber has an inlet area $A_{in}$ and an outlet area $A_{out}$ which is greater than $A_{in}$ by a factor of between about 3 and 8.

9. The apparatus defined by claim 7 wherein said inlet duct means has an inlet area $A_i$ and an outlet area $A_o$ having the relationship:

$$1.5 < (A_i/A_o) < 10.$$

10. The apparatus defined by claim 7 wherein said spray generating means constitutes an eductor comprising jet means for forming a stream of said liquid, nozzle means for receiving said stream in close-fitting relationship thereto, and support means for spacing said nozzle means from said jet means to provide an opening for gas to be induced into said nozzle means.

11. High efficiency aspirative gas-liquid contact apparatus, comprising:

spray generating means for receiving a liquid under pressure and for producing therefrom a full spray having an envelope which is divergent along an initial section thereof, and substantially non-divergent along a downstream section thereof;

means defining a spray chamber surrounding said spray and positioned on an axis common therewith, said chamber having a first component with a divergent inner surface which substantially fits said initial section of said spray envelope, and a second component with a substantially non-divergent inner surface which substantially fits said downstream section of said spray envelope; and a multiple stage inlet duct system for conducting gas to be aspirated from a gas supply to said spray, comprising:

a first duct means defining a passageway communicating with an inlet end of said initial section of said spray chamber, and a second duct means comprising radial impedance-matching means having axially spaced surfaces coaxial with said spray generating means for defining a second annular passageway such that its cross-sectional area decreases as a function of decreasing radius, said radial impedance-matching means communicating with an inlet end of said second component of said spray chamber through an annular axial venturi which surrounds said first component of said spray chamber and terminates in an annular opening at the entrance to said second component of said spray chamber, whereby gas induced into said spray through said second duct means acts to isolate said spray from said inner surface of said second component of said spray chamber substantially to prevent deposition of said spray thereon, said annular axial venturi being configured such that its cross-sectional area decreases as a function of axial distance from said spray generating means, at least said second duct means of said duct system acting to increase the velocity of said gas while decreasing the pressure thereof below that of the gas supply.

12. The apparatus defined by claim 11 wherein said spray chamber has an inlet area $A_{in}$ and an outlet area $A_{out}$ which is greater than $A_{in}$ by a factor of between 3 and 8.

13. The apparatus defined by claim 11 wherein said second inlet duct means has an inlet area $A_i$ and an outlet area $A_o$ having a relationship:

$$1.5 < (A_i/A_o) < 10.$$

14. The apparatus defined by claim 11 wherein said spray generating means constitutes an eductor comprising jet means for forming a stream of said liquid, nozzle means for receiving said stream in close-fitting relationship thereto, and support means for spacing said nozzle means from said jet means to provide an opening for gas to be induced into said nozzle means.

15. High efficiency aspirative gas-liquid contact apparatus, comprising:

spray generating means for receiving a liquid under pressure and for producing therefrom a full spray having an envelope which is substantially conically divergent along an initial section thereof;

means defining a spray chamber surrounding said spray and positioned on an axis common therewith, said chamber having an inner surface with a substantially conically divergent section substantially fitting said initial section of said spray envelope;

a multiple stage inlet duct system for conducting gas to be aspirated from a gas supply to said spray, a first stage of said system comprising a first radial impedance-matching duct means having axially spaced surfaces coaxial with and spaced from said nozzle means for defining an annular passageway communicating with an inlet end of said spray chamber adjacent said spray generating means, said passageway being configured such that its cross-sectional area decreases as a function of decreasing radius, said duct system including a second stage comprising a second radial impedance-matching duct means having axially spaced surfaces coaxial with said spray generating means for defining a second annular passageway communicating with said spray at a location downstream of said initial section of said spray envelope, said second passageway being configured such that its cross-sectional area decreases as a function of decreasing radius, said first and second stages of said duct system each acting to increase the velocity of said gas while decreasing the pressure thereof below that of the gas supply.

16. The apparatus defined by claim 15 wherein said first stage of said inlet duct system has an inlet area $A_i$ and an outlet area $A_o$ having the relationship:

$$1.5 < (A_i/A_o) < 10 .$$

17. The apparatus defined by claim 15 wherein said second stage of said inlet duct system has an inlet area $A_i$ and an outlet area $A_o$ having the relationship:

$$1.5 < (A_i/A_o) < 10.$$

18. High efficiency aspirative gas-liquid contact apparatus, comprising:

spray generating means for receiving a liquid under pressure and for producing therefrom a full spray having an envelope which is substantially conically divergent along an initial section thereof, and substantially non-divergent along a downstream section thereof;

means defining a spray chamber surrounding said spray and positioned on an axis common therewith, said chamber having a first component with a substantially conically divergent inner surface which substantially fits said initial section of said spray envelope, and a second component with a substantially non-divergent inner surface which substantially fits said downstream section of said spray envelope; and a multiple stage inlet duct system for conducting gas to be aspirated from a gas supply to said spray, comprising:

a first radial impedance-matching duct means having axially spaced surfaces coaxial with and spaced from said nozzle means for defining an annular passageway communicating with an inlet end of said initial section of said spray chamber, said passageway being configured such that its cross-sectional area decreases as a function of decreasing radius, and duct means comprising second radial impedance-matching means having axially spaced surfaces coaxial with said spray generating means for defining a second annular passageway configured such that its cross-sectional area decreases as a function of decreasing radius, said radial impedance-matching means communicating with an inlet end of said second component of said spray chamber through an annular axial venturi which surrounds said first component of said spray chamber and terminates in an annular opening at the entrance to said second component of said spray chamber, whereby gas induced into said spray through said second duct means acts to isolate said spray from said inner surface of said second component of said spray chamber to prevent substantial deposition of said spray thereon, said annular axial venturi being configured such that its cross-sectional area decreases as a function of axial distance from said spray generating means, said firt and second stages of said duct system each acting to increase the velocity of said gas while decreasing the pressure thereof below that of the gas supply.

19. The apparatus defined by claim 18 wherein said first inlet duct means has an inlet area $A_i$ and an outlet area $A_o$ having the relationship:

$$1.5 < (A_i/A_o) < 10.$$

20. The apparatus defined by claim 18 wherein said second inlet duct means has an inlet area $A_i$ and an outlet area $A_o$ having the relationship:

$$1.5 < (A_i/A_o) < 10.$$

21. The apparatus defined by claim 20 wherein said second inlet duct means has an inlet area $A_i$ and an outlet area $A_o$ having the relationship:

$$1.5 < (A_i/A_o) < 10.$$

22. The apparatus defined by claim 21 wherein said first component of said spray chamber has an outer surface which defines an inner surface of said annular axial venturi.

23. The apparatus defined by claim 22 wherein said spray chamber has an inlet area $A_{in}$ and an outlet area $A_{out}$ which is greater than $A_{in}$ by a factor of between about 3 and 8.

24. The apparatus defined by claim 22 wherein said spray generating means constitutes an eductor comprising jet means for forming a stream of said liquid, nozzle means for receiving said stream in close-fitting relationship thereto, and support means for spacing said nozzle means from said jet means to provide an opening for gas to be induced into said nozzle means.

25. High efficiency aspirative gas-liquid contact apparatus, comprising:

spray generating means for receiving a liquid under pressure and for producing therefrom a spray having a divergent envelope;

means defining a spray chamber receiving said spray;

radial impedance-matching inlet duct means for conducting gas to be aspirated from a gas supply to said spray chamber, said duct means having axially spaced surfaces with and spaced from said spray generating means for defining an annular passageway leading to an inlet end of said spray chamber adjacent said spray generating means in which cross-sectional area decreases as a function of decreasing radius, said duct means acting to increase the velocity of said gas while decreasing the pressure thereof below that of the gas supply; and means in said inlet duct means for creating turbulence in the flow of gas in said duct means and in said spray chamber to thereby maximize the gas-liquid contact in said chamber.

26. Evaporative cooling apparatus, comprising:

spray generating means for receiving an evaporable liquid under pressure and for producing therefrom a full spray having a diverging envelope;

means defining a spray chamber surrounding said spray, and positioned on a common axis therewith, said chamber having a divergent configuration substantially fitting said spray envelope;

radial impedance-matching inlet duct means for conducting gas to be aspirated from a gas supply to said spray chamber, said duct means having axially spaced surfaces coaxial with and spaced from said spray generating means for defining an annular passageway leading to an inlet end of said spray chamber adjacent said spray generating means in which cross-sectional area decreases as a function of decreasing radius, said duct means acting to decrease the pressure of said gas below that of the gas supply while increasing the velocity thereof.

27. High efficiency gas-liquid contact apparatus useful for oxygenation, gas scrubbing, chemical reaction enhancement, fuel combustion, and the like, comprising:

spray generating means for receiving a liquid under pressure and for producing therefrom a full spray having a diverging envelope;

means defining a spray chamber surrounding said spray and positioned on a common axis therewith, said chamber having a divergent configuration substantially fitting said spray envelope;

radial impedance-matching inlet duct means for conducting gas to be aspirated from a gas supply to said spray chamber, said duct means having axially spaced surfaces coaxial with and spaced from said spray generating means for defining an annular passageway leading to an inlet end of said spray chamber adjacent said nozzle means in which cross-sectional area decreases as a function of decreasing radius, said duct means acting to decrease the pressure of said gas below that of the gas supply while increasing the velocity thereof.

28. High efficiency aspirative gas-liquid contact apparatus, comprising:

spray generating means for receiving a liquid under pressure and for producing therefrom a spray having a divergent envelope;

means defining a divergent spray chamber surrounding and substantially fitting said spray envelope; conduit means surrounding and spaced from said spray chamber and extending downstream thereof, said spray chamber and conduit means defining a venturi inlet duct means for conducting gas to be aspirated from a gas supply to said spray chamber, said duct means having an inlet effective cross-sectional area which is greater than its outlet effective cross-sectional area, said duct means acting to increase the velocity of sad gas while decreasing the pressure thereof below that of the gas supply; and means in said inlet duct means for creating turbulence in the flow of gas is said duct means and in said chamber to thereby maximize the gas-liquid contact in said chamber.

* * * * *

PO-1050
(5/69)

UNITED STATES PATENT OFFICE
CERTIFICATE OF CORRECTION

Patent No. 3,761,065 Dated September 25, 1973

Inventor(s) STANLEY R. RICH and THEOPHANES G. PANTAZELOS

It is certified that error appears in the above-identified patent and that said Letters Patent are hereby corrected as shown below:

Column 1, line 31, after "inducing" insert --a--

Column 3, line 10, change "daigram" to --diagram--

Column 7, line 29, change "venturs" to --venturi--

Column 10, line 28, change "63" to --64--

Column 15, line 41, change "firt" to --first--

Column 18, line 9, change "is" to --in--

Signed and sealed this 9th day of July 1974.

(SEAL)
Attest:

McCOY M. GIBSON, JR.
Attesting Officer

C. MARSHALL DANN
Commissioner of Patents